United States Patent
Raichelgauz et al.

(10) Patent No.: US 11,386,139 B2
(45) Date of Patent: Jul. 12, 2022

(54) SYSTEM AND METHOD FOR GENERATING ANALYTICS FOR ENTITIES DEPICTED IN MULTIMEDIA CONTENT

(71) Applicant: Cortica, Ltd., Tel Aviv (IL)

(72) Inventors: Igal Raichelgauz, Tel Aviv (IL); Karina Odinaev, Tel Aviv (IL); Yehoshua Y Zeevi, Haifa (IL)

(73) Assignee: Cortica Ltd., Tel Aviv (IL)

( * ) Notice: Subject to any disclaimer, the term of this patent is extended or adjusted under 35 U.S.C. 154(b) by 1168 days.

(21) Appl. No.: 15/818,081

(22) Filed: Nov. 20, 2017

(65) Prior Publication Data

US 2018/0137127 A1 May 17, 2018

Related U.S. Application Data

(60) Provisional application No. 62/424,572, filed on Nov. 21, 2016.

(51) Int. Cl.
*G06F 16/438* (2019.01)
*H04L 67/10* (2022.01)
(Continued)

(52) U.S. Cl.
CPC .......... *G06F 16/4393* (2019.01); *G06F 16/41* (2019.01); *H04H 20/103* (2013.01);
(Continued)

(58) Field of Classification Search
CPC ...... G06N 20/00; G06F 16/4393; G06F 16/41
(Continued)

(56) References Cited

U.S. PATENT DOCUMENTS

| 4,733,353 A | 3/1988 | Jaswa |
| 4,932,645 A | 6/1990 | Schorey et al. |

(Continued)

FOREIGN PATENT DOCUMENTS

| WO | 0231764 | 4/2002 |
| WO | 2003005242 A1 | 1/2003 |

(Continued)

OTHER PUBLICATIONS

Ma Et El. ("Semantics modeling based image retrieval system using neural networks" 2005 (Year: 2005).
(Continued)

*Primary Examiner* — David R Vincent
(74) *Attorney, Agent, or Firm* — Reches Patents

(57) ABSTRACT

A system and method for generating analytics for entities depicted in multimedia content, including: identifying at least one social pattern based on social linking scores of a plurality of entities indicated in a social linking graph, wherein each social pattern is identified at least by comparing one of the social linking scores to a predetermined social pattern threshold, wherein each social linking score is generated based on contexts of at least one multimedia content element (MMCE) in which at least two of the plurality of entities are depicted, wherein each context is determined based on a plurality of concepts of one of the at least one MMCE, wherein each concept matches at least one signature generated for the at least one MMCE above a predetermined threshold; and generating, based on the identified at least one social pattern, analytics for the plurality of entities depicted in the social linking graph.

19 Claims, 10 Drawing Sheets

(51) Int. Cl.
| | |
|---|---|
| *H04H 60/56* | (2008.01) |
| *H04H 60/37* | (2008.01) |
| *H04H 20/26* | (2008.01) |
| *H04N 21/81* | (2011.01) |
| *H04N 21/466* | (2011.01) |
| *H04N 21/2668* | (2011.01) |
| *H04N 21/258* | (2011.01) |
| *H04N 7/173* | (2011.01) |
| *H04H 60/66* | (2008.01) |
| *H04H 60/46* | (2008.01) |
| *H04H 20/10* | (2008.01) |
| *H04L 67/50* | (2022.01) |
| *G06F 16/41* | (2019.01) |

(52) U.S. Cl.
CPC ............ *H04H 20/26* (2013.01); *H04H 60/37* (2013.01); *H04H 60/46* (2013.01); *H04H 60/56* (2013.01); *H04H 60/66* (2013.01); *H04L 67/10* (2013.01); *H04L 67/22* (2013.01); *H04L 67/535* (2022.05); *H04N 7/17318* (2013.01); *H04N 21/25891* (2013.01); *H04N 21/2668* (2013.01); *H04N 21/466* (2013.01); *H04N 21/8106* (2013.01)

(58) Field of Classification Search
USPC .................................................... 706/15, 45
See application file for complete search history.

(56) References Cited

U.S. PATENT DOCUMENTS

| | | | |
|---|---|---|---|
| 4,972,363 | A | 11/1990 | Nguyen et al. |
| 5,307,451 | A | 4/1994 | Clark |
| 5,568,181 | A | 10/1996 | Greenwood et al. |
| 5,745,678 | A | 4/1998 | Herzberg et al. |
| 5,806,061 | A | 9/1998 | Chaudhuri et al. |
| 5,852,435 | A | 12/1998 | Vigneaux et al. |
| 5,870,754 | A | 2/1999 | Dimitrova et al. |
| 5,873,080 | A | 2/1999 | Coden et al. |
| 5,887,193 | A | 3/1999 | Takahashi et al. |
| 5,978,754 | A | 11/1999 | Kumano |
| 6,052,481 | A | 4/2000 | Grajski et al. |
| 6,076,088 | A | 6/2000 | Paik et al. |
| 6,122,628 | A | 9/2000 | Castelli et al. |
| 6,128,651 | A | 10/2000 | Cezar |
| 6,137,911 | A | 10/2000 | Zhilyaev |
| 6,144,767 | A | 11/2000 | Bottou et al. |
| 6,147,636 | A | 11/2000 | Gershenson |
| 6,243,375 | B1 | 6/2001 | Speicher |
| 6,243,713 | B1 | 6/2001 | Nelson et al. |
| 6,275,599 | B1 | 8/2001 | Adler et al. |
| 6,329,986 | B1 | 12/2001 | Cheng |
| 6,381,656 | B1 | 4/2002 | Shankman |
| 6,411,229 | B2 | 6/2002 | Kobayashi |
| 6,422,617 | B1 | 7/2002 | Fukumoto et al. |
| 6,507,672 | B1 | 1/2003 | Watkins et al. |
| 6,523,046 | B2 | 2/2003 | Liu et al. |
| 6,524,861 | B1 | 2/2003 | Anderson |
| 6,550,018 | B1 | 4/2003 | Abonamah et al. |
| 6,594,699 | B1 | 7/2003 | Sahai et al. |
| 6,611,628 | B1 | 8/2003 | Sekiguchi et al. |
| 6,618,711 | B1 | 9/2003 | Ananth |
| 6,640,015 | B1 | 10/2003 | Lafruit |
| 6,643,620 | B1 | 11/2003 | Contolini et al. |
| 6,643,643 | B1 | 11/2003 | Lee et al. |
| 6,665,657 | B1 | 12/2003 | Dibachi |
| 6,704,725 | B1 | 3/2004 | Lee |
| 6,732,149 | B1 | 5/2004 | Kephart |
| 6,751,363 | B1 | 6/2004 | Natsev et al. |
| 6,751,613 | B1 | 6/2004 | Lee et al. |
| 6,754,435 | B2 | 6/2004 | Kim |
| 6,763,069 | B1 | 7/2004 | Divakaran et al. |
| 6,763,519 | B1 | 7/2004 | McColl et al. |
| 6,774,917 | B1 | 8/2004 | Foote et al. |
| 6,795,818 | B1 | 9/2004 | Lee |
| 6,804,356 | B1 | 10/2004 | Krishnamachari |
| 6,819,797 | B1 | 11/2004 | Smith et al. |
| 6,845,374 | B1 | 1/2005 | Oliver et al. |
| 6,901,207 | B1 | 5/2005 | Watkins |
| 6,938,025 | B1 | 8/2005 | Lulich et al. |
| 7,006,689 | B2 | 2/2006 | Kasutani |
| 7,013,051 | B2 | 3/2006 | Sekiguchi et al. |
| 7,020,654 | B1 | 3/2006 | Najmi |
| 7,043,473 | B1 | 5/2006 | Rassool et al. |
| 7,047,033 | B2 | 5/2006 | Wyler |
| 7,158,681 | B2 | 1/2007 | Persiantsev |
| 7,199,798 | B1 | 4/2007 | Echigo et al. |
| 7,215,828 | B2 | 5/2007 | Luo |
| 7,260,564 | B1 | 8/2007 | Lynn et al. |
| 7,277,928 | B2 | 10/2007 | Lennon |
| 7,302,117 | B2 | 11/2007 | Sekiguchi et al. |
| 7,313,805 | B1 | 12/2007 | Rosin et al. |
| 7,340,458 | B2 | 3/2008 | Vaithilingam et al. |
| 7,353,224 | B2 | 4/2008 | Chen et al. |
| 7,376,672 | B2 | 5/2008 | Weare |
| 7,376,722 | B1 | 5/2008 | Sim et al. |
| 7,433,895 | B2 | 10/2008 | Li et al. |
| 7,464,086 | B2 | 12/2008 | Black et al. |
| 7,519,238 | B2 | 4/2009 | Robertson et al. |
| 7,526,607 | B1 | 4/2009 | Singh et al. |
| 7,536,417 | B2 | 5/2009 | Walsh et al. |
| 7,574,668 | B2 | 8/2009 | Nunez et al. |
| 7,577,656 | B2 | 8/2009 | Kawai et al. |
| 7,657,100 | B2 | 2/2010 | Gokturk et al. |
| 7,660,468 | B2 | 2/2010 | Gokturk et al. |
| 7,660,737 | B1 | 2/2010 | Lim et al. |
| 7,689,544 | B2 | 3/2010 | Koenig |
| 7,694,318 | B2 | 4/2010 | Eldering et al. |
| 7,697,791 | B1 | 4/2010 | Chan et al. |
| 7,769,221 | B1 | 8/2010 | Shakes et al. |
| 7,788,132 | B2 | 8/2010 | Desikan et al. |
| 7,788,247 | B2 | 8/2010 | Wang et al. |
| 7,801,893 | B2 | 9/2010 | Gulli |
| 7,836,054 | B2 | 11/2010 | Kawai et al. |
| 7,860,895 | B1 | 12/2010 | Scofield et al. |
| 7,904,503 | B2 | 3/2011 | De |
| 7,920,894 | B2 | 4/2011 | Wyler |
| 7,921,107 | B2 | 4/2011 | Chang et al. |
| 7,933,407 | B2 | 4/2011 | Keidar et al. |
| 7,974,994 | B2 | 7/2011 | Li et al. |
| 7,987,194 | B1 | 7/2011 | Walker et al. |
| 7,987,217 | B2 | 7/2011 | Long et al. |
| 7,991,715 | B2 | 8/2011 | Schiff et al. |
| 8,000,655 | B2 | 8/2011 | Wang et al. |
| 8,036,893 | B2 | 10/2011 | Reich |
| 8,098,934 | B2 | 1/2012 | Vincent et al. |
| 8,112,376 | B2 | 2/2012 | Raichelgauz et al. |
| 8,266,185 | B2 | 9/2012 | Raichelgauz et al. |
| 8,275,764 | B2 | 9/2012 | Jeon |
| 8,312,031 | B2 | 11/2012 | Raichelgauz et al. |
| 8,315,442 | B2 | 11/2012 | Gokturk et al. |
| 8,316,005 | B2 | 11/2012 | Moore |
| 8,326,775 | B2 | 12/2012 | Raichelgauz et al. |
| 8,332,478 | B2 | 12/2012 | Levy et al. |
| 8,345,982 | B2 | 1/2013 | Gokturk et al. |
| RE44,225 | E | 5/2013 | Aviv |
| 8,527,978 | B1 | 9/2013 | Sallam |
| 8,548,828 | B1 | 10/2013 | Longmire |
| 8,634,980 | B1 | 1/2014 | Urmson |
| 8,655,801 | B2 | 2/2014 | Raichelgauz et al. |
| 8,677,377 | B2 | 3/2014 | Cheyer et al. |
| 8,682,667 | B2 | 3/2014 | Haughay |
| 8,688,446 | B2 | 4/2014 | Yanagihara |
| 8,706,503 | B2 | 4/2014 | Cheyer et al. |
| 8,775,442 | B2 | 7/2014 | Moore et al. |
| 8,781,152 | B2 | 7/2014 | Momeyer |
| 8,782,077 | B1 | 7/2014 | Rowley |
| 8,799,195 | B2 | 8/2014 | Raichelgauz et al. |
| 8,799,196 | B2 | 8/2014 | Raichelquaz et al. |
| 8,818,916 | B2 | 8/2014 | Raichelgauz et al. |
| 8,868,619 | B2 | 10/2014 | Raichelgauz et al. |
| 8,880,539 | B2 | 11/2014 | Raichelgauz et al. |

(56) References Cited

U.S. PATENT DOCUMENTS

| | | |
|---|---|---|
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,298,763 B1 | 3/2016 | Zack |
| 9,323,754 B2 | 4/2016 | Ramanathan et al. |
| 9,330,189 B2 | 5/2016 | Raichelgauz et al. |
| 9,438,270 B2 | 9/2016 | Raichelgauz et al. |
| 9,440,647 B1 | 9/2016 | Sucan |
| 9,734,533 B1 | 8/2017 | Givot |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze et al. |
| 2001/0038876 A1 | 11/2001 | Anderson |
| 2001/0056427 A1 | 12/2001 | Yoon et al. |
| 2002/0010682 A1 | 1/2002 | Johnson |
| 2002/0019881 A1 | 2/2002 | Bokhari et al. |
| 2002/0019882 A1 | 2/2002 | Bokhani |
| 2002/0037010 A1 | 3/2002 | Yamauchi |
| 2002/0038299 A1 | 3/2002 | Zernik et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0037010 A1 | 2/2003 | Schmelzer |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0101150 A1 | 5/2003 | Agnihotri |
| 2003/0105739 A1 | 6/2003 | Essafi et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0059736 A1 | 3/2004 | Willse |
| 2004/0068510 A1 | 4/2004 | Hayes et al. |
| 2004/0091111 A1 | 5/2004 | Levy |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0230572 A1 | 11/2004 | Omoigui |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0172130 A1 | 8/2005 | Roberts |
| 2005/0177372 A1 | 8/2005 | Wang et al. |
| 2005/0193015 A1 | 9/2005 | Logston |
| 2005/0238238 A1 | 10/2005 | Xu et al. |
| 2005/0245241 A1 | 11/2005 | Durand et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242130 A1 | 10/2006 | Sadri |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0251339 A1 | 11/2006 | Gokturk |
| 2006/0253423 A1 | 11/2006 | McLane et al. |
| 2007/0019864 A1 | 1/2007 | Koyama et al. |
| 2007/0033163 A1 | 2/2007 | Epstein et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0168413 A1 | 7/2007 | Barletta et al. |
| 2007/0195987 A1 | 8/2007 | Rhoads |
| 2007/0196013 A1 | 8/2007 | Li |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0294295 A1 | 12/2007 | Finkelstein et al. |
| 2007/0298152 A1 | 12/2007 | Baets |
| 2008/0019614 A1 | 1/2008 | Robertson et al. |
| 2008/0040277 A1 | 2/2008 | DeWitt |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0109433 A1 | 5/2008 | Rose |

(56) References Cited

U.S. PATENT DOCUMENTS

| | | |
|---|---|---|
| 2008/0152231 A1 | 6/2008 | Gokturk |
| 2008/0163288 A1 | 7/2008 | Ghosal et al. |
| 2008/0165861 A1 | 7/2008 | Wen et al. |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0313140 A1 | 12/2008 | Pereira et al. |
| 2009/0013414 A1 | 1/2009 | Washington et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0089587 A1 | 4/2009 | Brunk et al. |
| 2009/0119157 A1 | 5/2009 | Dulepet |
| 2009/0125529 A1 | 5/2009 | Vydiswaran et al. |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0204511 A1 | 8/2009 | Tsang |
| 2009/0216639 A1 | 8/2009 | Kapczynski et al. |
| 2009/0216761 A1 | 8/2009 | Raichelgauz |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254824 A1 | 10/2009 | Singh |
| 2009/0277322 A1 | 11/2009 | Cai et al. |
| 2009/0278934 A1 | 11/2009 | Ecker |
| 2010/0023400 A1 | 1/2010 | DeWitt |
| 2010/0042646 A1 | 2/2010 | Raichelqauz |
| 2010/0082684 A1 | 4/2010 | Churchill |
| 2010/0088321 A1 | 4/2010 | Solomon et al. |
| 2010/0104184 A1 | 4/2010 | Bronstein et al. |
| 2010/0106857 A1 | 4/2010 | Wyler |
| 2010/0111408 A1 | 5/2010 | Matsuhira |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0191567 A1 | 7/2010 | Lee et al. |
| 2010/0268524 A1 | 10/2010 | Nath et al. |
| 2010/0306193 A1 | 12/2010 | Pereira |
| 2010/0318493 A1 | 12/2010 | Wessling |
| 2010/0322522 A1 | 12/2010 | Wang et al. |
| 2011/0029620 A1 | 2/2011 | Bonforte |
| 2011/0035289 A1 | 2/2011 | King et al. |
| 2011/0038545 A1 | 2/2011 | Bober |
| 2011/0052063 A1 | 3/2011 | McAuley et al. |
| 2011/0055585 A1 | 3/2011 | Lee |
| 2011/0106782 A1 | 5/2011 | Ke et al. |
| 2011/0125727 A1 | 5/2011 | Zou et al. |
| 2011/0145068 A1 | 6/2011 | King et al. |
| 2011/0202848 A1 | 8/2011 | Ismalon |
| 2011/0208822 A1 | 8/2011 | Rathod |
| 2011/0246566 A1 | 10/2011 | Kashef |
| 2011/0251896 A1 | 10/2011 | Impollonia et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0133497 A1 | 5/2012 | Sasaki |
| 2012/0150890 A1 | 6/2012 | Jeong et al. |
| 2012/0167133 A1 | 6/2012 | Carroll et al. |
| 2012/0179751 A1 | 7/2012 | Ahn |
| 2012/0185445 A1 | 7/2012 | Borden et al. |
| 2012/0191686 A1 | 7/2012 | Hjelm et al. |
| 2012/0197857 A1 | 8/2012 | Huang et al. |
| 2012/0239694 A1 | 9/2012 | Avner et al. |
| 2012/0299961 A1 | 11/2012 | Ramkumar et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0086499 A1 | 4/2013 | Dyor et al. |
| 2013/0089248 A1 | 4/2013 | Remiszewski |
| 2013/0103814 A1 | 4/2013 | Carrasco |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0212493 A1 | 8/2013 | Krishnamurthy |
| 2013/0226820 A1 | 8/2013 | Sedota, Jr. |
| 2013/0262588 A1* | 10/2013 | Barak ................ G06K 9/00221 709/204 |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta |
| 2014/0147829 A1 | 5/2014 | Jerauld |
| 2014/0152698 A1 | 6/2014 | Kim et al. |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0317510 A1* | 10/2014 | Ku ........................ G06F 3/0484 715/720 |
| 2014/0330830 A1 | 11/2014 | Raichelgauz et al. |
| 2014/0379477 A1 | 12/2014 | Sheinfeld |
| 2015/0033150 A1 | 1/2015 | Lee |
| 2015/0117784 A1 | 4/2015 | Lin |
| 2015/0134688 A1 | 5/2015 | Jing |
| 2015/0185827 A1* | 7/2015 | Sayed ...................... G06F 3/013 345/156 |
| 2015/0242755 A1* | 8/2015 | Gross ................ G06Q 30/0241 706/46 |
| 2015/0286742 A1 | 10/2015 | Zhang et al. |
| 2015/0289022 A1 | 10/2015 | Gross |
| 2015/0304437 A1* | 10/2015 | Vaccari .................. H04L 51/32 709/204 |
| 2015/0363644 A1 | 12/2015 | Wnuk |
| 2016/0007083 A1* | 1/2016 | Gurha .................. H04N 21/252 725/13 |
| 2016/0026707 A1 | 1/2016 | Ong et al. |
| 2016/0210525 A1 | 7/2016 | Yang |
| 2016/0221592 A1 | 8/2016 | Puttagunta |
| 2016/0224871 A1* | 8/2016 | Koren .................. G06K 9/6284 |
| 2016/0342683 A1 | 11/2016 | Kwon |
| 2016/0357188 A1 | 12/2016 | Ansari |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0115797 A1* | 4/2018 | Wexler .................... H04L 51/32 |
| 2018/0157916 A1 | 6/2018 | Doumbouya |
| 2018/0158323 A1 | 6/2018 | Takenaka |
| 2018/0184171 A1* | 6/2018 | Danker .............. H04N 21/4788 |
| 2018/0204111 A1 | 7/2018 | Zadeh |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |

(56) References Cited

U.S. PATENT DOCUMENTS

| | | |
|---|---|---|
| 2019/0065951 A1 | 2/2019 | Luo |
| 2019/0188501 A1 | 6/2019 | Ryu |
| 2019/0220011 A1 | 7/2019 | Della Penna |
| 2019/0317513 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

FOREIGN PATENT DOCUMENTS

| | | |
|---|---|---|
| WO | 2003067467 A1 | 8/2003 |
| WO | 2004019527 A1 | 3/2004 |
| WO | 2005027457 A1 | 3/2005 |
| WO | 20070049282 | 5/2007 |
| WO | 2014137337 A1 | 9/2014 |
| WO | 2016040376 A1 | 3/2016 |

OTHER PUBLICATIONS

Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org/ on Aug. 2, 2017.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-1.
Ribert et al. "An Incremental Hierarchical Clustering", Visicon Interface 1999, pp. 586-591.
Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM.2015.7314122 IEEE Conference Publications.
Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Schneider, et. al., "A Robust Content Based Digital Signature for Image Authentication", Proc. ICIP 1996, Laussane, Switzerland, Oct. 1996, pp. 227-230.
Semizarov et al. "Specificity of Short Interfering RNA Determined through Gene Expression Signatures", PNAS, 2003, pp. 6347-6352.
Shih-Fu Chang, et al., "VideoQ: A Fully Automated Video Retrieval System Using Motion Sketches", 1998, IEEE, , New York, pp. 1-2.
The International Search Report and the Written Opinion for PCT/US2016/050471, ISA/RU, Moscow, RU, dated May 4, 2017.
The International Search Report and the Written Opinion for PCT/US2016/054634 dated Mar. 16, 2017, ISA/RU, Moscow, RU.
The International Search Report and the Written Opinion for PCT/US2017/015831, ISA/RU, Moscow, Russia, dated Apr. 20, 2017.
Theodoropoulos et al, "Simulating Asynchronous Architectures on Transputer Networks", Proceedings of the Fourth Euromicro Workshop On Parallel and Distributed Processing, 1996. PDP '96.
Vailaya, et al., "Content-Based Hierarchical Classification of Vacation Images," I.E.E.E.: Multimedia Computing and Systems, vol. 1, 1999, East Lansing, MI, pp. 518-523.
Vallet, et al., "Personalized Content Retrieval in Context Using Ontological Knowledge," IEEE Transactions on Circuits and Systems for Video Technology, vol. 17, No. 3, Mar. 2007, pp. 336-346.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005; Entire Document.
Wang et al. "A Signature for Content-based Image Retrieval Using a Geometrical Transform", ACM 1998, pp. 229-234.
Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.
Wei-Te Li et al., "Exploring Visual and Motion Saliency for Automatic Video Object Extraction", IEEE, vol. 22, No. 7, Jul. 2013, pp. 1-11.
Whitby-Strevens, "The Transputer", 1985 IEEE, Bristol, UK.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Yanagawa, et al., "Columbia University's Baseline Detectors for 374 LSCOM Semantic Visual Concepts." Columbia University ADVENT technical report, 2007, pp. 222-2006-8.
Yanai, "Generic Image Classification Using Visual Knowledge on the Web," MM'03, Nov. 2-8, 2003, Tokyo, Japan, pp. 167-176.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002; Entire Document.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.
Zou, et al., "A Content-Based Image Authentication System with Lossless Data Hiding", ICME 2003, pp. 213-216.
Jasinschi et al., A Probabilistic Layered Framework for Integrating Multimedia Content and Context Information, 2002, IEEE, p. 2057-2060. (Year: 2002).
Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).
Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: May 8, 2018). (Year: 2018).

(56) References Cited

OTHER PUBLICATIONS

Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

Boari et al., "Adaptive Routing for Dynamic Applications in Massively Parallel Architectures", 1995 IEEE, Spring 1995.

Brecheisen, et al., "Hierarchical Genre Classification for Large Music Collections", ICME 2006, pp. 1385-1388.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al., "Feed-forward Echo State Networks"; Proceedings of International Joint Conference on Neural Networks, Montreal, Canada, Jul. 31-Aug. 4, 2005; Entire Document.

Chuan-Yu Cho, et al., "Efficient Motion-Vector-Based Video Search Using Query by Clip", 2004, IEEE, Taiwan, pp. 1-4.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Fathy et al., "A Parallel Design and Implementation For Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan et al., "Content-Based Retrieval of Music and Audio"; 1997, Institute of Systems Science, National University of Singapore, Singapore (ABSTRACT).

Freisleben et al., "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.

Gomes et al., "Audio Watermaking and Fingerprinting: For Which Applications?" University of Rene Descartes, Paris, France, 2003.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004. 1434102 IEEE Conference Publications, Hong Kong.

Guo et al, "AdOn: An Intelligent Overlay Video Advertising System", SIGIR, Boston, Massachusetts, Jul. 19-23, 2009.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Hua, et al., "Robust Video Signature Based on Ordinal Measure", Image Processing, 2004. 2004 International Conference on Image Processing (ICIP), vol. 1, IEEE, pp. 685-688, 2004.

Ihab Al Kabary, et al., "SportSense: Using Motion Queries to Find Scenes in Sports Videos", Oct. 2013, ACM, Switzerland, pp. 1-3.

International Search Authority: "Written Opinion of the International Searching Authority" (PCT Rule 43bis.1) including International Search Report for International Patent Application No. PCT/US2008/073852; dated Jan. 28, 2009.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.

International Search Report for the corresponding International Patent Application PCT/IL2006/001235; dated Nov. 2, 2008.

IPO Examination Report under Section 18(3) for corresponding UK application No. GB1001219.3, dated May 30, 2012.

IPO Examination Report under Section 18(3) for corresponding UK application No. GB1001219.3, dated Sep. 12, 2011; Entire Document.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Jaeger, H.: "The "echo state" approach to analysing and training recurrent neural networks", GMD Report, No. 148, 2001, pp. 1-43, XP002466251 German National Research Center for Information Technology.

Jianping Fan et al., "Concept-Oriented Indexing of Video Databases: Towards Semantic Sensitive Retrieval and Browsing", IEEE, vol. 13, No. 7, Jul. 2004, pp. 1-19.

Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.

Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Lin, et al., "Robust Digital Signature for Multimedia Authentication: A Summary", IEEE Circuits and Systems Magazine, 4th Quarter 2003, pp. 23-26.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Maass, W. et al.: "Computational Models for Generic Cortical Microcircuits", Institute for Theoretical Computer Science, Technische Universitaet Graz, Graz, Austria, published Jun. 10, 2003.

Mahdhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

May et al., "The Transputer", Springer-Verlag, Berlin Heidelberg, 1989, teaches multiprocessing system.

McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Mladenovic, et al., "Electronic Tour Guide for Android Mobile Platform with Multimedia Travel Book", Telecommunications Forum

(56) References Cited

OTHER PUBLICATIONS (TELFOR), 2012 20th Year: 2012, pp. 1460-1463, DOI: 10.1109/TELFOR.2012.6419494 IEEE Conference Publications.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.
Nam, et al., "Audio Visual Content-Based Violent Scene Characterization", Department of Electrical and Computer Engineering, Minneapolis, MN, 1998, pp. 353-357.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Odinaev, et al., "Cliques in Neural Ensembles as Perception Carriers", Technion—Israel Institute of Technology, 2006 International Joint Conference on Neural Networks, Canada, 2006, pp. 285-292.
Ortiz-Boyer et al., "CIXL2: A Crossover Operator for Evolutionary Algorithms Based on Population Features", Journal of Artificial Intelligence Research 24 (2005), pp. 1-48 Submitted Nov. 2004; published Jul. 2005.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.

* cited by examiner

SYSTEM AND METHOD FOR GENERATING ANALYTICS FOR ENTITIES DEPICTED IN MULTIMEDIA CONTENT

CROSS-REFERENCE TO RELATED APPLICATIONS

This application claims the benefit of U.S. Provisional Application No. 62/424,572 filed on Nov. 21, 2016. This application is also a continuation-in-part of U.S. patent application Ser. No. 13/770,603 filed on Feb. 19, 2013, which is a continuation-in-part (CIP) of U.S. patent application Ser. No. 13/624,397 filed on Sep. 21, 2012, now U.S. Pat. No. 9,191,626. The Ser. No. 13/624,397 application is a CIP of:
  (a) U.S. patent application Ser. No. 13/344,400 filed on Jan. 5, 2012, now U.S. Pat. No. 8,959,037, which is a continuation of U.S. patent application Ser. No. 12/434,221 filed on May 1, 2009, now U.S. Pat. No. 8,112,376;
  (b) U.S. patent application Ser. No. 12/195,863 filed on Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084,150; and
  (c) U.S. patent application Ser. No. 12/084,150 having a filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005, and Israeli Application No. 173409 filed on Jan. 29, 2006.

All of the applications referenced above are herein incorporated by reference.

TECHNICAL FIELD

The present disclosure relates generally to contextual analysis of multimedia content elements, and more specifically to identifying patterns from entities depicted in multimedia content based on the contextual analysis of multimedia content.

BACKGROUND

Since the advent of digital photography and, in particular, after the rise of social networks, the Internet has become inundated with uploaded images, videos, and other content. Often, individuals wish to identify persons captured in images, videos and other content, as well as identify relationships between various identified persons.

Some people manually tag multimedia content in order to indicate the persons shown in images and videos in an effort to assists users seeking content featuring the persons to view the tagged content. The tags may be textual or include other identifiers in metadata of the multimedia content, thereby associating the textual identifiers with the multimedia content. Users may subsequently search for multimedia content elements with respect to tags by providing queries indicating desired subject matter. Tags therefore make it easier for users to find content related to a particular topic.

A popular textual tag is the hashtag. A hashtag is a type of label typically used on social networking websites, chats, forums, microblogging services, and the like. Users create and use hashtags by placing the hash character (or number sign) # in front of a word or unspaced phrase, either in the main text of a message associated with content, or at the end. Searching for that hashtag will then present each message and, consequently, each multimedia content element, that has been tagged with it.

Accurate and complete listings of hashtags can increase the likelihood of a successful search for a certain multimedia content. Existing solutions for tagging typically rely on user inputs to provide identifications of subject matter. However, such manual solutions may result in inaccurate or incomplete tagging. Further, although some automatic tagging solutions exist, such solutions face challenges in efficiently and accurately identifying subject matter of multimedia content, including individuals presented within the multimedia content. Moreover, such solutions typically only recognize superficial expressions of subject matter in multimedia content and, therefore, fail to account for context in tagging multimedia content.

Additionally, tagging often fails to demonstrate certain analytics, such as relationships between subjects within one or multiple multimedia content items. For example, a set of images showing two individuals may appear on a user profile of a social media account, but the social media platform may be unaware of the relationship between the two individuals. Further, it may be difficult to visualize the relationship among a larger group of individuals based on multimedia content items when relying on manual tagging to identify subjects within the multimedia content item or to determine underlying patterns among the relationships between the individuals.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for generating analytics for entities depicted in multimedia content, including: identifying at least one social pattern based on social linking scores of a plurality of entities indicated in a social linking graph, wherein each social pattern is identified at least by comparing one of the social linking scores to a predetermined social pattern threshold, wherein each social linking score is generated based on contexts of at least one multimedia content element (MMCE) in which at least two of the plurality of entities are depicted, wherein each context is determined based on a plurality of concepts of one of the at least one MMCE, wherein each concept matches at least one signature generated for the at least one MMCE above a predetermined threshold; and generating, based on the identified at least one social pattern, analytics for the plurality of entities depicted in the social linking graph.

Certain embodiments disclosed herein also include a non-transitory computer readable medium having stored thereon instructions for causing a processing circuitry to perform a process, the process including: identifying at least one social pattern based on social linking scores of a plurality of entities indicated in a social linking graph, wherein each social pattern is identified at least by comparing one of the social linking scores to a predetermined social pattern threshold, wherein each social linking score is generated based on contexts of at least one multimedia content element (MMCE) in which at least two of the plurality of entities are depicted, wherein each context is determined based on a plurality of concepts of one of the at least one MMCE, wherein each concept matches at least one signature generated for the at least one MMCE above a predetermined threshold; and generating, based on the identified at least one social pattern, analytics for the plurality of entities depicted in the social linking graph.

Certain embodiments disclosed herein also include a system for generating analytics for entities depicted in multimedia content, including a processing circuitry; and a memory, the memory containing instructions that, when executed by the processing circuitry, configure the system to: identify at least one social pattern based on social linking scores of a plurality of entities indicated in a social linking graph, wherein each social pattern is identified at least by comparing one of the social linking scores to a predetermined social pattern threshold, wherein each social linking score is generated based on contexts of at least one multimedia content element (MMCE) in which at least two of the plurality of entities are depicted, wherein each context is determined based on a plurality of concepts of one of the at least one MMCE, wherein each concept matches at least one signature generated for the at least one MMCE above a predetermined threshold; and generate, based on the identified at least one social pattern, analytics for the plurality of entities depicted in the social linking graph.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
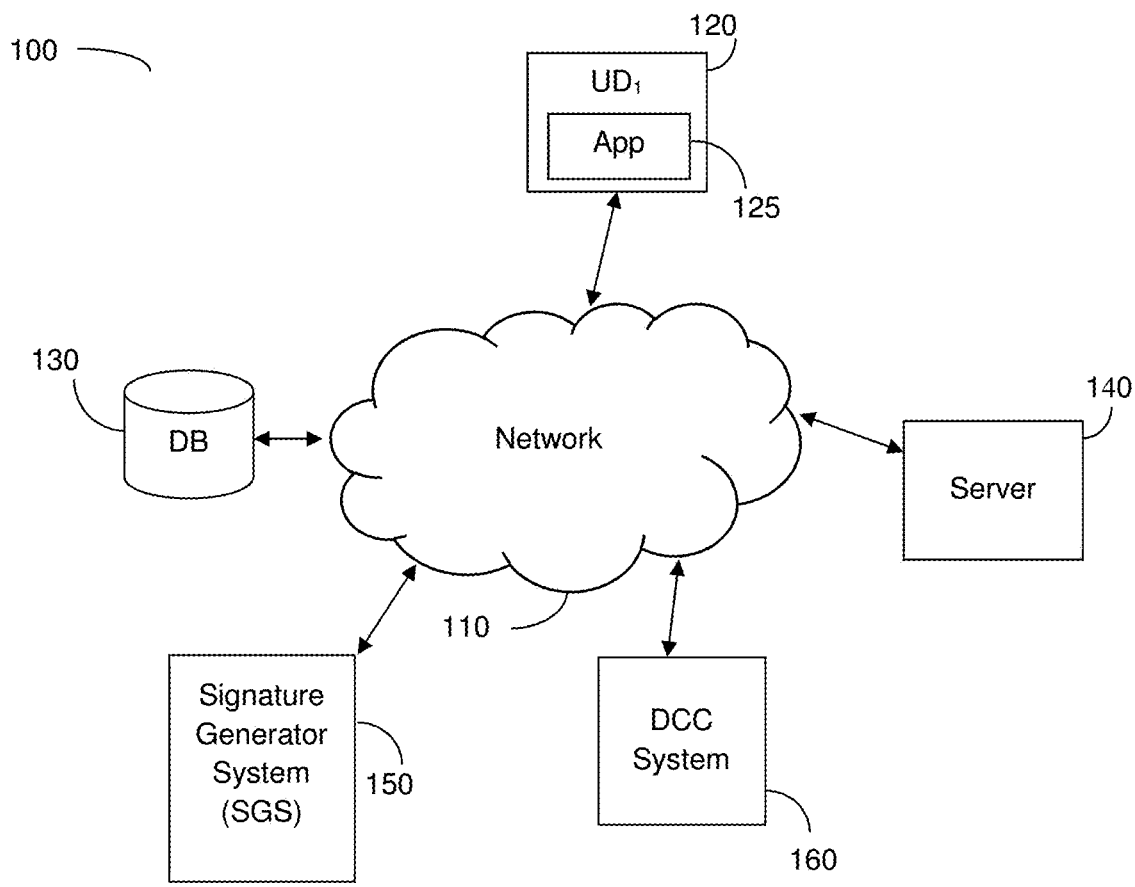
FIG. 1 is an example network diagram utilized for describing certain embodiment of the system for determining a social relativeness between entities.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for analyzing multimedia content elements and generating social linking scores of individuals represented in the multimedia content items. Signatures are generated for each multimedia content element. Based on the generated signatures, one or more individuals shown in the multimedia content element are identified.

One or more contexts are generated based on the generated signatures. Based on the generated context and associated metadata, a social linking score is generated for each person shown in the multimedia content element. The generated social linking score may be based on, for example, an amount of multimedia content elements in which a person is shown, a time stamp associated with a first appearance in a multimedia content element, a time stamp associated with a last appearance in a multimedia content element, physical interaction with the user in the multimedia content elements (e.g., kissing, hugging, shaking hands, etc.), a location coordinate identified based on the analysis, other persons identified therein, tags, comments, and the like. In an embodiment, a social linking graph is generated based on the generated scores.

FIG. 1 is an example network diagram 100 utilized for describing certain embodiments disclosed herein. A user device 120, a database (DB) 130, a server 140, a signature generator system (SGS) 150, and a Deep Content Classification (DCC) system 160 are connected to a network 110. The network 110 may be, but is not limited to, a local area network (LAN), a wide area network (WAN), a metro area network (MAN), the world wide web (WWW), the Internet, a wired network, a wireless network, and the like, as well as any combination thereof.

The user device 120 may be, but is not limited to, a personal computer (PC), a personal digital assistant (PDA), a mobile phone, a smart phone, a tablet computer, a wearable computing device, and other kinds of wired and mobile devices capable of capturing, uploading, browsing, viewing, listening, filtering, and managing multimedia content elements as further discussed herein below. The user device 120 may have installed thereon an application 125 such as, but not limited to, a web browser. The application 125 may be downloaded from an application repository, such as the AppStore®, Google Play®, or any repositories hosting software applications. The application 125 may be pre-installed in the user device 120.

The application 125 may be configured to store and access multimedia content elements within the user device, such as on an internal storage (not shown), as well as to access multimedia content elements from an external source, such as the database or a social media website. For example, the application 125 may be a web browser through which a user of the user device 120 accesses a social media website and uploads multimedia content elements thereto.

The database 130 is configured to store MMCEs, signatures generated based on MMCEs, concepts that have been generated based on signatures, contexts that have been generated based on concepts, social linking scores, social linking graphs, or a combination thereof. The database 130 is accessible by the server 140, either via the network 110 (as shown in FIG. 1) or directly (not shown).

The server 140 is configured to communicate with the user device 120 via the network 110. The server 140 may include a processing circuitry such as a processing circuitry and a memory (both not shown). The processing circuitry may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In an embodiment, the memory is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry to perform the various processes described herein. Specifically, the instructions, when executed, configure the processing circuitry to determine social linking scores, as discussed further herein below.

In an embodiment, the server 140 is configured to access to a plurality of multimedia content elements (MMCEs), for example, from the user device 120 via the application 125 installed thereon, that are associated with a user of the user device 120. The MMCEs may be, for example, an image, a graphic, a video stream, a video clip, an audio stream, an audio clip, a video frame, a photograph, and/or combinations thereof and portions thereof. The MMCEs may be captured by a sensor (not shown) of the user device 120. The sensor may be, for example, a still camera, a video camera, a combination thereof, etc. Alternatively, the MMCEs may be accessed from a web source over the network 110, such as a social media website, or from the database 140.

The server 140 is configured to analyze the plurality of MMCEs and generate signatures based on each of the MMCEs. In an embodiment, the MMCEs are sent to the SGS 150 over the network 110. In an embodiment, the SGS 150 is configured to generate at least on signature for each MMCE, based on content of the received MMCE as further described herein. The signatures may be robust to noise and distortion as discussed below.

According to further embodiment, the server 140 may further be configured to identify metadata associated with each of the MMCEs. The metadata may include, for example, a time stamp of the capturing of the MMCE, the device used for the capturing, a location pointer, tags or comments, and the like.

The Deep Content Classification (DCC) system 160 is configured to identify at least one concept based on the generated signatures. Each concept is a collection of signatures representing MMCEs and metadata describing the concept, and acts as an abstract description of the content to which the signature was generated. As a non-limiting example, a 'Superman concept' is a signature-reduced cluster of signatures describing elements (such as multimedia elements) related to, e.g., a Superman cartoon: a set of metadata representing proving textual representation of the Superman concept. As another example, metadata of a concept represented by the signature generated for a picture showing a bouquet of red roses is "flowers". As yet another example, metadata of a concept represented by the signature generated for a picture showing a bouquet of wilted roses is "wilted flowers".

The server 140 is further configured to generate one or more contexts for each MMCE in which a person is shown. Each context is determined by correlating among the signatures, the concepts, or both. A strong context may be determined, e.g., when there are at least a threshold number of concepts that satisfy the same predefined condition. As a non-limiting example, by correlating a signature of a person in a baseball uniform with a signature of a baseball stadium, a context representing a "baseball player" may be determined. Correlations among the concepts of multimedia content elements can be achieved using probabilistic models by, e.g., identifying a ratio between signatures' sizes, a spatial location of each signature, and the like. Determining contexts for multimedia content elements is described further in the above-referenced U.S. patent application Ser. No. 13/770,603, assigned to the common assignee, which is hereby incorporated by reference. It should be noted that using signatures for determining the context ensures more accurate reorganization of multimedia content than, for example, when using metadata.

Based on the generated contexts and associated metadata, or both, the server 140 is configured to generate a social linking score associated with each person depicted in the MMCEs. The social linking score is a value representing the social relativeness of two or more entities, where the social relativeness indicates how close the entities are within a social sphere. The entities may include, but are not limited to, people. As a non-limiting example, upon identifying a certain person as the user's son, the social linking score shall be higher than, for example, a colleague of the user. The generation of the social linking score is further described herein below with respect to FIG. 7.

In an embodiment, based on the social linking scores, the server 140 is configured to generate a social linking graph representative of the persons shown in the MMCEs and their respective social linking scores. An example of the social linking graph is shown herein below in FIG. 8. In a further embodiment, the server 140 is configured to generate analytics based on the social linking scores, the social linking graphs, the MMCEs, combinations thereof, portions thereof, and the like. Analytics may include, but are not limited to, a social relationship and social status between two or more entities.

It should be noted that only one user device 120 and one application 125 are discussed with reference to FIG. 1 merely for the sake of simplicity. However, the embodiments disclosed herein are applicable to a plurality of user devices that can communicate with the server 130 via the network 110, where each user device includes at least one application.

Figure 2:
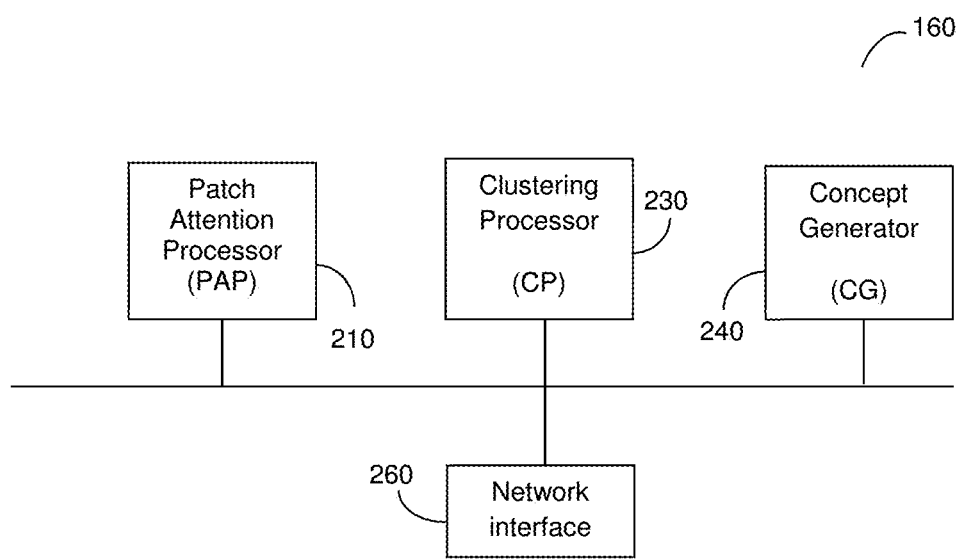
FIG. 2 is an example diagram of a Deep Content Classification system for creating concepts according to an embodiment.

FIG. 2 shows an example diagram of a DCC system 160 for creating concepts. The DCC system 160 is configured to receive a first MMCE and at least a second MMCE, for example from the server 140 via a network interface 260.

The MMCEs are processed by a patch attention processor (PAP) 210, resulting in a plurality of patches that are of specific interest, or otherwise of higher interest than other patches. A more general pattern extraction, such as an attention processor (AP) (not shown) may also be used in lieu of patches. The AP receives the MMCE that is partitioned into items; an item may be an extracted pattern or a patch, or any other applicable partition depending on the type of the MMCE. The functions of the PAP 210 are described herein below in more detail.

The patches that are of higher interest are then used by a signature generator, e.g., the SGS 150 of FIG. 1, to generate signatures based on the patch. A clustering processor (CP) 230 inter-matches the generated signatures once it determines that there are a number of patches that are above a predefined threshold. The threshold may be defined to be large enough to enable proper and meaningful clustering. With a plurality of clusters, a process of clustering reduction takes place so as to extract the most useful data about the cluster and keep it at an optimal size to produce meaningful results. The process of cluster reduction is continuous. When new signatures are provided after the initial phase of the operation of the CP 230, the new signatures may be immediately checked against the reduced clusters to save on the operation of the CP 230. A more detailed description of the operation of the CP 230 is provided herein below.

A concept generator (CG) 240 is configured to create concept structures (hereinafter referred to as concepts) from the reduced clusters provided by the CP 230. Each concept comprises a plurality of metadata associated with the reduced clusters. The result is a compact representation of a concept that can now be easily compared against a MMCE to determine if the received MMCE matches a concept stored, for example, in the database 130 of FIG. 1. This can be done, for example and without limitation, by providing a query to the DCC system 160 for finding a match between a concept and a MMCE.

It should be appreciated that the DCC system 160 can generate a number of concepts significantly smaller than the number of MMCEs. For example, if one billion ($10^9$) MMCEs need to be checked for a match against another one billon MMCEs, typically the result is that no less than $10^9 \times 10^9 = 10^{18}$ matches have to take place. The DCC system 160 would typically have around 10 million concepts or less, and therefore at most only $2 \times 10^6 \times 10^9 = 2 \times 10^{15}$ comparisons need to take place, a mere 0.2% of the number of matches that have had to be made by other solutions. As the number of concepts grows significantly slower than the number of MMCEs, the advantages of the DCC system 160 would be apparent to one with ordinary skill in the art.

Figure 3:
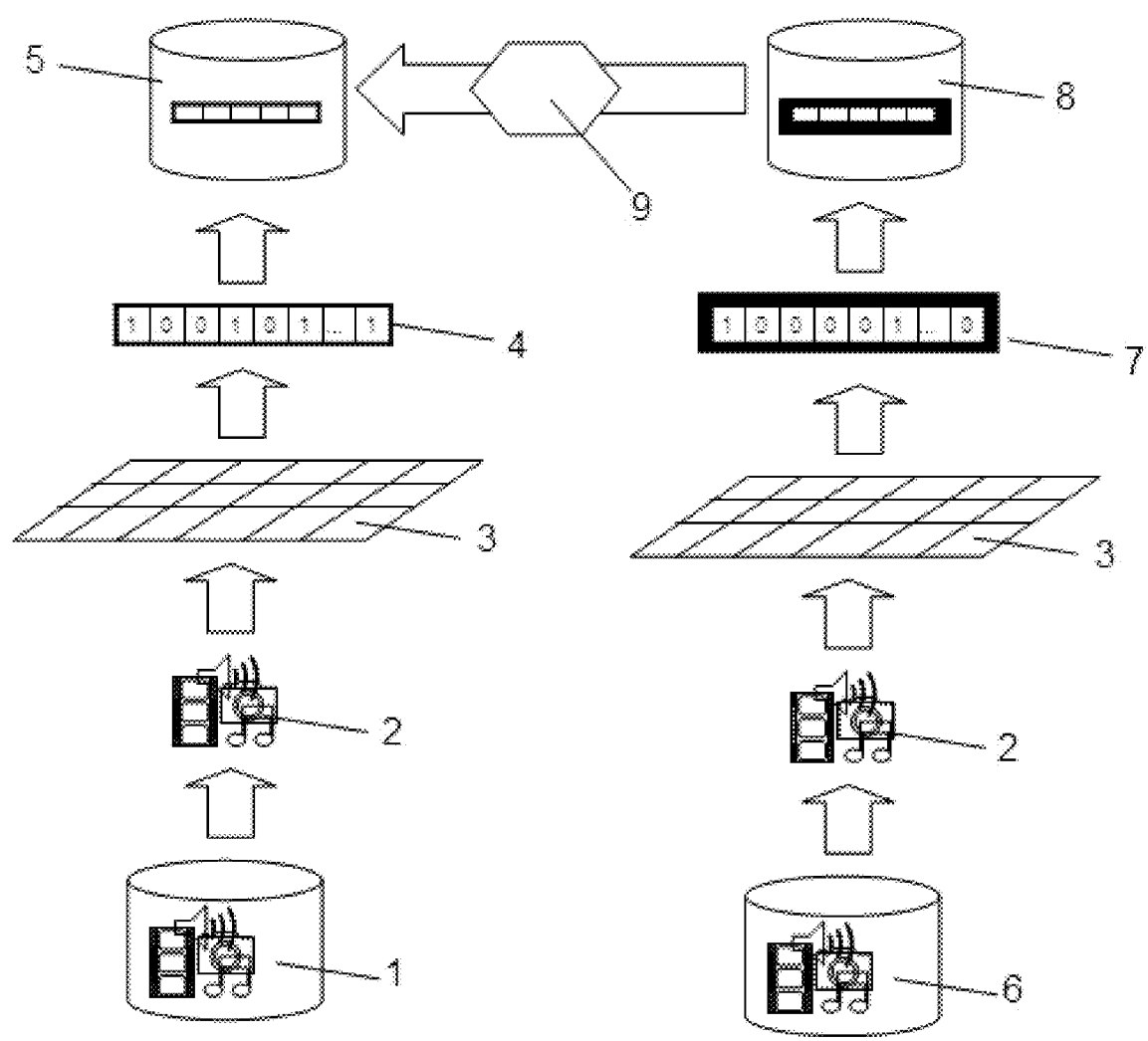
FIG. 3 is a block diagram depicting the basic flow of information in the signature generator system.
Figure 4:
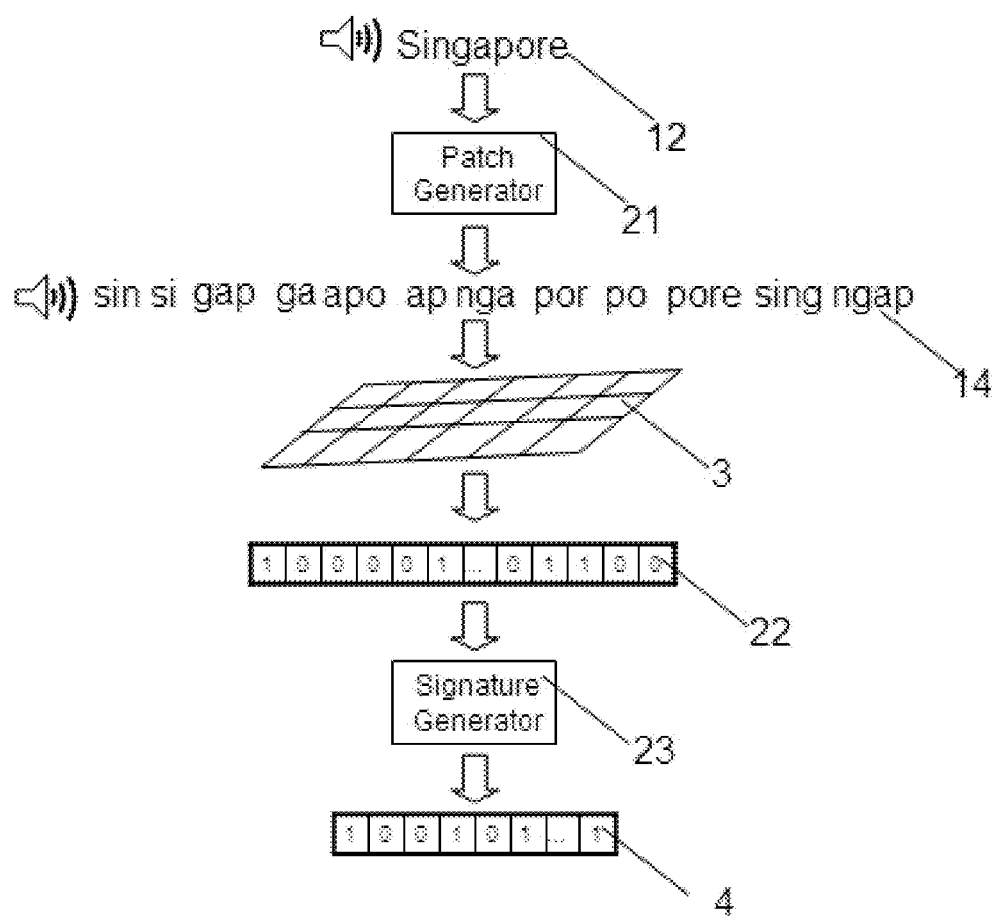
FIG. 4 is a diagram showing the flow of patches generation, response vector generation, and signature generation in a large-scale speech-to-text system.

FIGS. 3 and 4 illustrate the generation of signatures for the multimedia content elements by the SGS 150 according to an embodiment. An example high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames. In an embodiment the server 130 is configured with a plurality of computational cores to perform matching between signatures.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 140 and SGS 150. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i = \{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$$n_i = \theta(V_i - Th_x)$$

where, $\theta$ is a Heaviside step function; $w_{ij}$ is a coupling node unit (CNU) between node i and image component j (for example, grayscale value of a certain pixel j); kj is an image component 'j' (for example, grayscale value of a certain pixel j); Thx is a constant Threshold value, where 'x' is 'S' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For: $V_i > Th_{RS}$
   $1 - p(V > Th_S) - 1 - (1-\varepsilon)^l \ll 1$ i.e., given that l nodes (cores) constitute a Robust Signature of a certain image I, the probability that not all of these I nodes will belong to the Signature of same, but noisy image, Ĩ is sufficiently low (according to a system's specified accuracy).

2: $p(V_i > Th_{RS}) \approx 1/L$ i.e., approximately 1 out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. No. 8,326,775, assigned to the common assignee, which is hereby incorporated by reference.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the U.S. Pat. No. 8,655,801 referenced above, the contents of which are incorporated by reference.

Signatures are generated by the Signature Generator System based on patches received either from the PAP 210, or retrieved from the database 130, as discussed herein above. It should be noted that other ways for generating signatures may also be used for the purpose the DCC system 160. Furthermore, as noted above, the array of computational cores may be used by the PAP 210 for the purpose of determining if a patch has an entropy level that is of interest for signature generation according to the principles of the invention.

Figure 5:
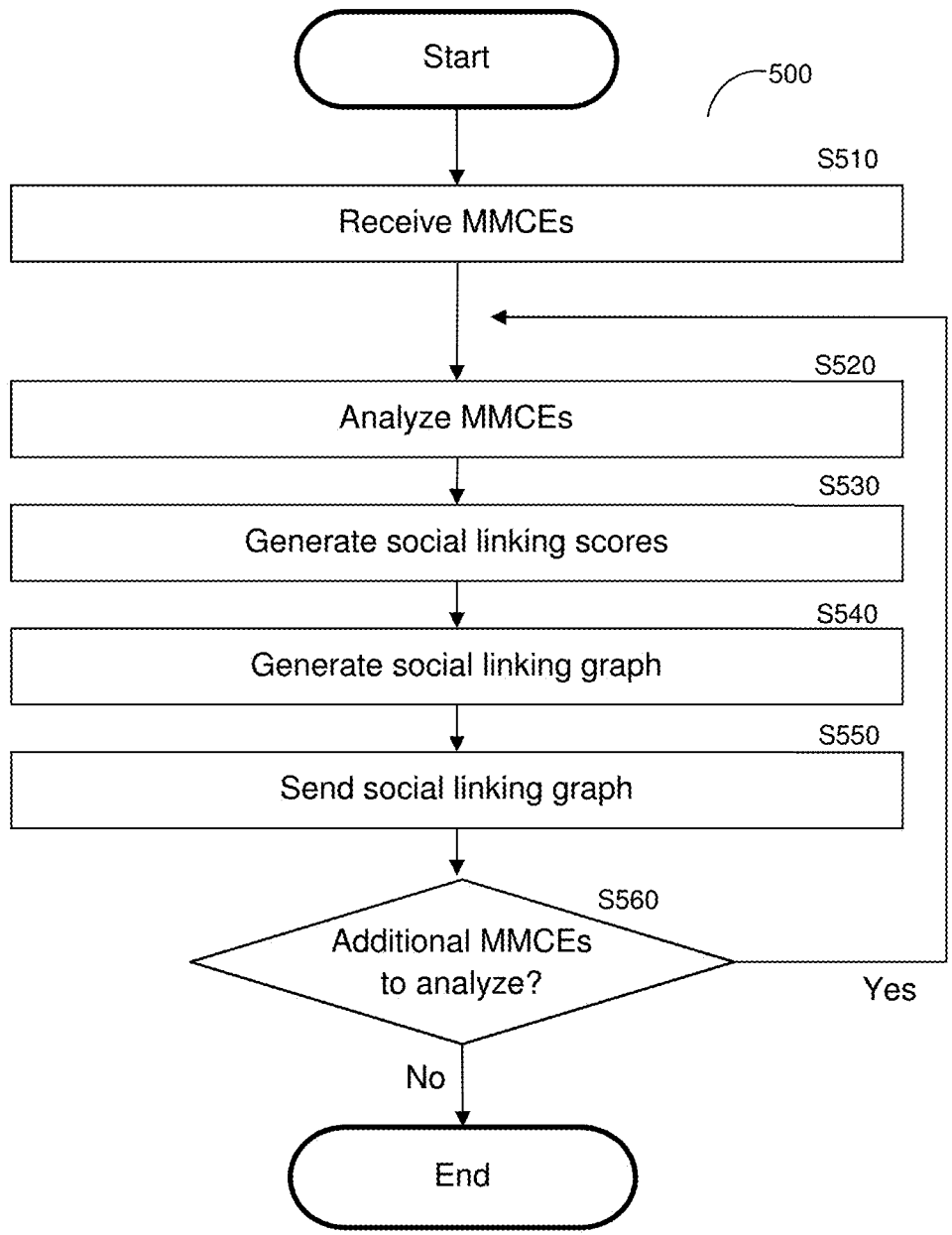
FIG. 5 is a flowchart of a method for generating social linking scores for persons shown in multimedia content elements according to an embodiment.

FIG. 5 illustrates a flowchart of a method 500 for generating social linking scores for persons shown in multimedia content elements according to an embodiment. In an embodiment, the method may be performed by the server 140, FIG. 1.

At S510, a plurality of MMCEs are received. At S520, the MMCEs are analyzed. In an embodiment, the analysis includes generating signatures, concepts, contexts, or a combination thereof, based on the received MMCEs as further described herein with respect to FIGS. 1 and 6.

At S530, a social linking score is generated for each person shown in the received MMCEs based on the analysis. Generating social linking scores is further described herein below with respect to FIG. 7.

At optional S540, a social linking graph is generated based on the generated social linking scores, where the social linking graph is a visual representation of the connections and relationship between persons identified within the received MMCEs. At optional S550, the social linking graph is sent to, for example, a user device (e.g., the user device 120, FIG. 1). At S560, it is checked whether additional MMCEs are to be analyzed and if so, execution continues with S520; otherwise, execution terminates.

Figure 6:
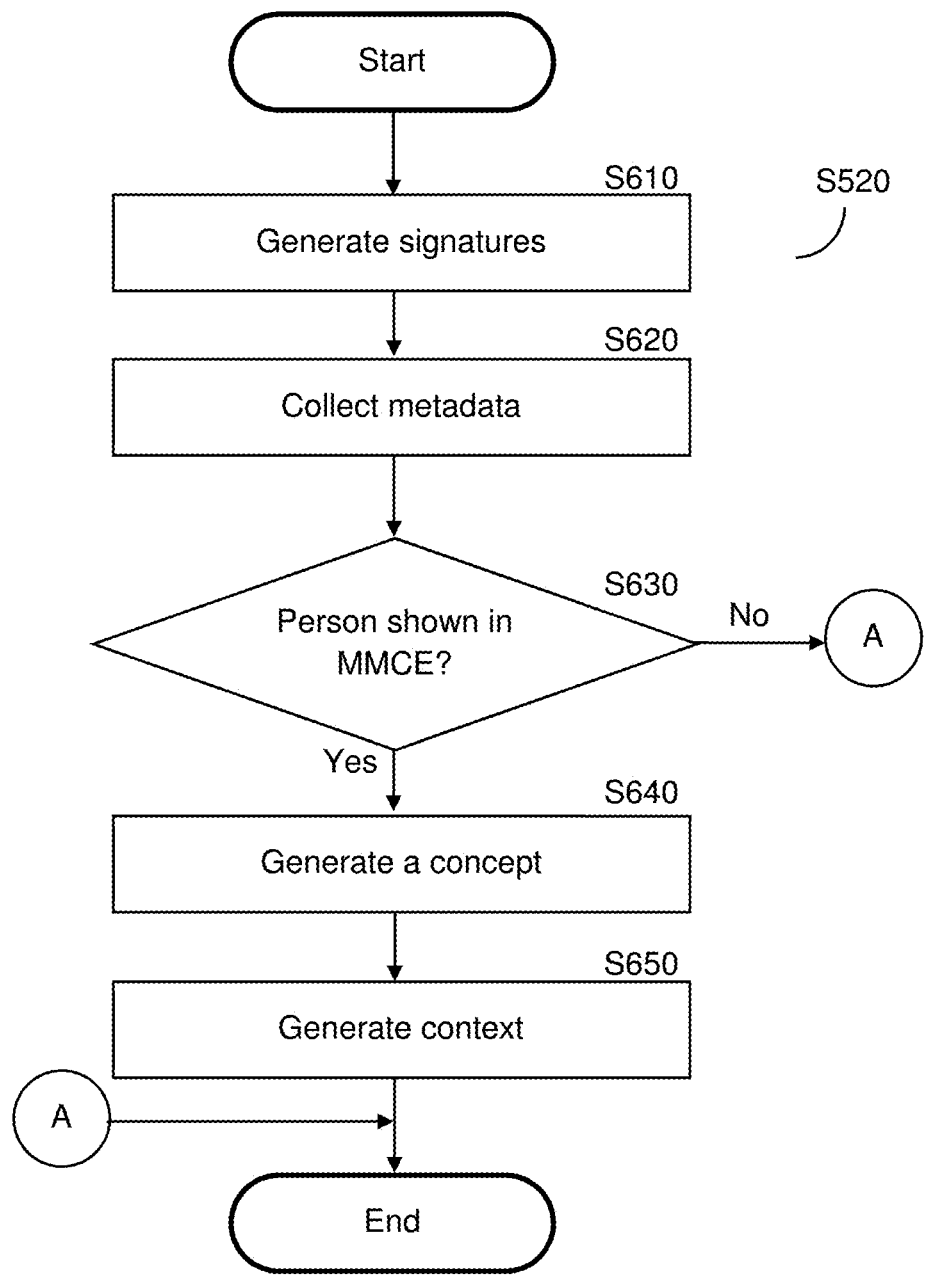
FIG. 6 is a flowchart illustrating a method of analyzing an MMCE according to an embodiment.

FIG. 6 is a flowchart illustrating a method S520 of analyzing an MMCE according to an embodiment. At S610, at least one signature is generated for the MMCE, as described above with respect to FIG. 1, where signatures represent at least a portion of the MMCE. At S620, metadata associated with the MMCE is collected. The metadata may include, for example, a time stamp of the capturing of the MMCE, the device used for the capturing, a location pointer, tags or comments associated therewith, and the like.

At S630, based on the generated signatures and collected metadata, it is determined if at least one person is shown or depicted within the MMCE. If so, execution continues with S640; otherwise, execution terminates. In an embodiment, S630 includes comparing the generated signatures to reference signatures representing people, where it is determined that at least one person is shown when at least a portion of the generated signatures matches the reference signatures above a predetermined threshold.

At S640, when it is determined that a person is depicted in the MMCE, concepts are generated, where a concept is a collection of signatures representing elements of the unstructured data and metadata describing the concept. Each generated concept represents a person depicted in the MMCE. At S650, a context is generated based on correlation between the generated concepts. A context is determined as the correlation between a plurality of concepts.

Figure 7:
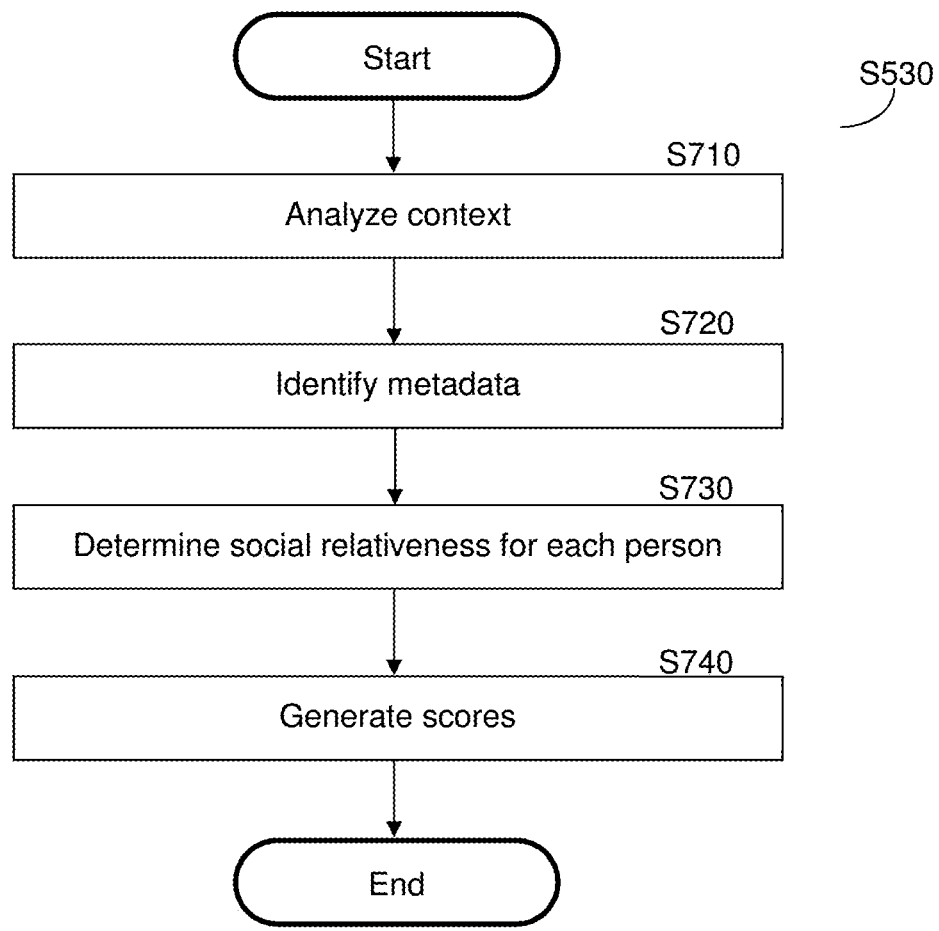
FIG. 7 is a flowchart illustrating a method of generating a social linking score in an embodiment.

FIG. 7 is a flowchart illustrating a method S530 of generating a social linking score in an embodiment. At S710, the generated context of each MMCE having a person shown therein is analyzed. At S720, metadata associated with the MMCEs is identified. At S730, based on the generated context and the identified metadata, the social relativeness between two or more persons shown in each MMCE and the user is determined. At S740, a social linking score is generated based on the social relativeness determination, and execution terminates. Each social linking score represents a closeness between two persons. For example, family members may have a higher social linking score than friends or acquaintances.

The generated social linking score may be based on, for example, an amount of multimedia content elements in which a person is shown, a time stamp associated with a first appearance in a multimedia content element, a time stamp associated with a last appearance in a multimedia content element, physical interaction with the user in the multimedia content elements (e.g., kissing, hugging, shaking hands, etc.), a location coordinate identified based on the analysis, other persons therein, tags and comments, a combination thereof, and the like.

In an embodiment, the social linking score may be determined based on weighted scoring. For example, if person A and person B only appear in one MMCE where they are kissing, while person A and person C appear in twenty MMCEs without physical contact, it may be determined that persons A and B are related or have a very close relationship, whereas persons A and C are not closely connected. Accordingly, the social linking score generated for persons A and B may be higher than the social linking score generated for persons B and C. In a further example, if persons A and D appear in an MMCE together where they are the only persons identified within the MMCE, and persons A and E appear together in large group picture, it may be determined that persons A and D have a closer relationship that persons A and E, and the social linking score generated for persons A and D may be higher than the social linking score generated for persons A and E.

Figure 8:
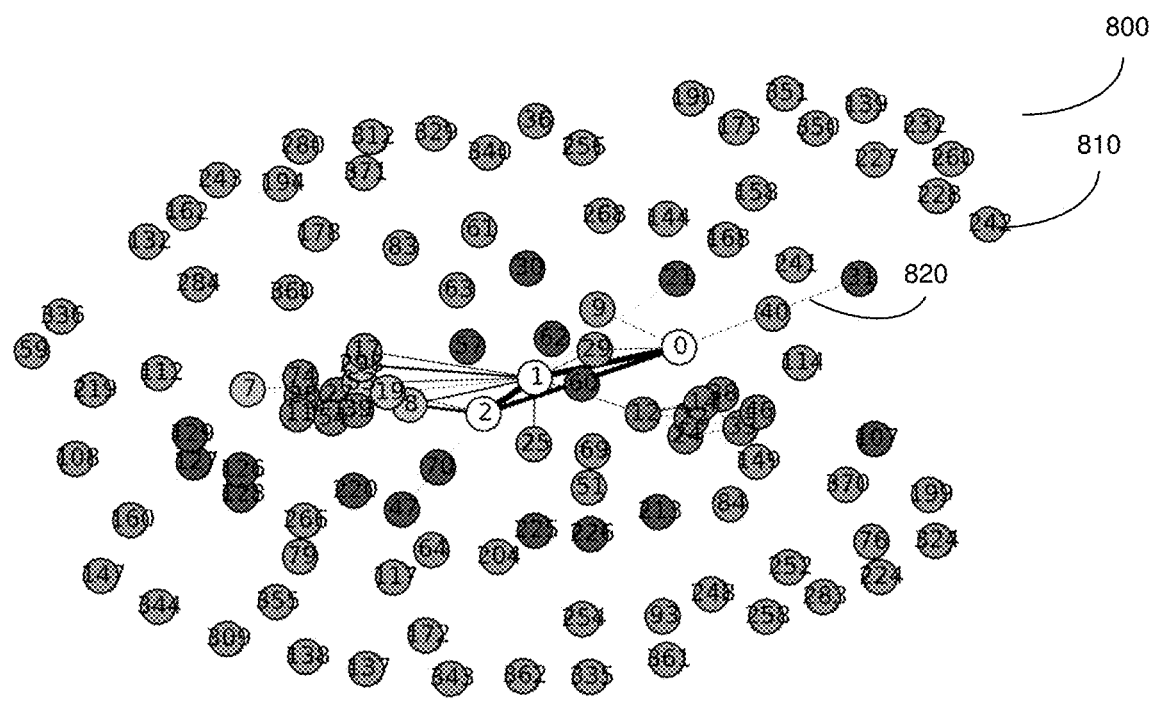
FIG. 8 is an example diagram of a social linking graph in an embodiment.

FIG. 8 is an example diagram of a social linking graph 800 in an embodiment. The social linking graph 800 visually represents the social relativeness of each person shown in the MMCEs associated with the user of a user device, for example, the user device 120. Each circle 810 represents a person identified in the MMCEs. In an embodiment, lines 820 are shown extending between circles to represent connection between persons shown in the MMCEs. In some implementations, different colors, shading, line thickness, and other visual markers may be utilized to differentiate among individuals having higher social linking scores than individuals having lower social linking scores.

Figure 9:
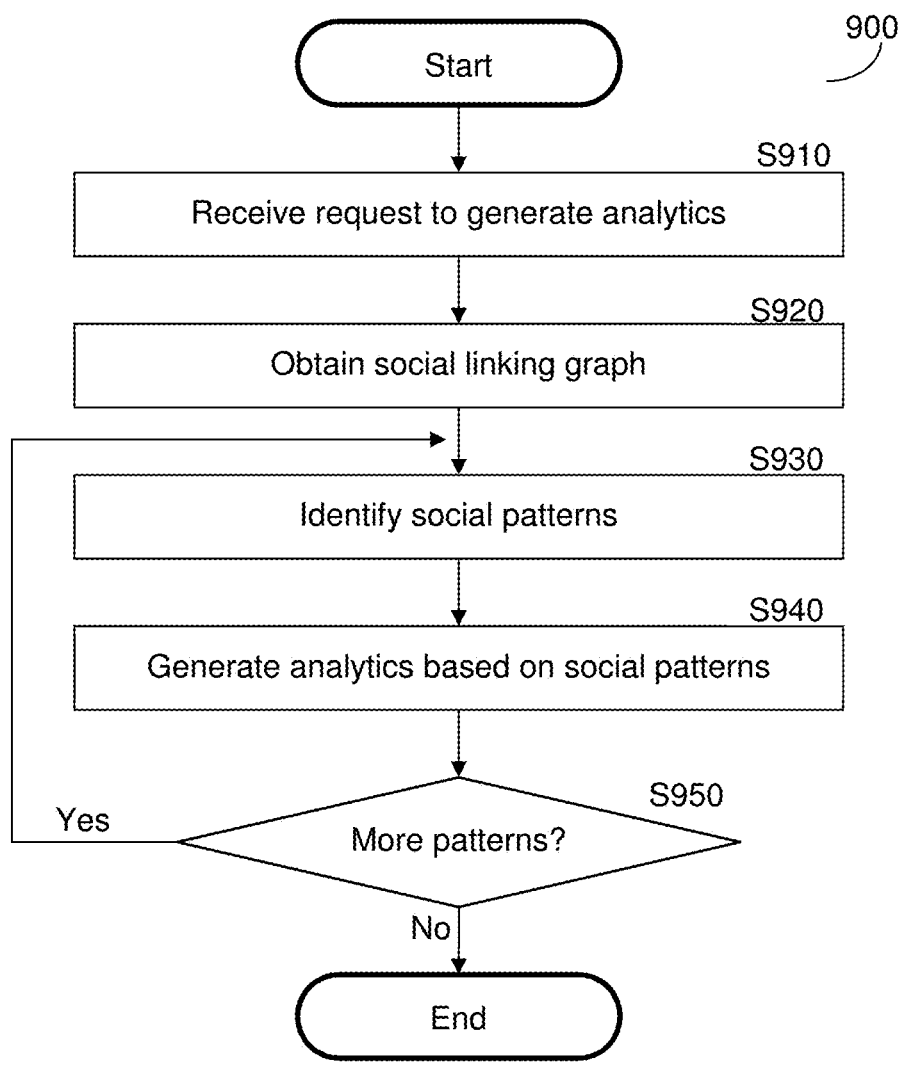
FIG. 9 is a flowchart illustrating a method of generating analytics based on social patterns according to an embodiment.

FIG. 9 is a flowchart illustrating a method 900 for generating analytics based on social patterns according to an embodiment. In an embodiment, the method may be performed by the server 140, FIG. 1.

At S910, a request is received to generate analytics. In some implementations, the request may be received from a user device.

At S920, a social linking graph is obtained. In an embodiment, the social linking graph is retrieved from a database, e.g., the database 130 of FIG. 1. The social linking graph indicates entities and social linking scores, where each entity is associated with social linking scores indicating the social relativeness between the entity and other entities of the social linking graph.

At S930, a social pattern is identified based on the social linking graph. The social pattern may be determined by analyzing the social linking graph, the social linking scores, MMCEs associated with the social linking graph, a combination thereof, a portion thereof, and the like. To this end, S930 may include determining whether one or more predetermined social pattern thresholds are met. The social pattern threshold may be, but is not limited to, a social linking score, number of connections, a number of MMCEs in which two or more of the same entities appear and the like.

The social pattern may include social characteristics such as connections between two or more entities, locations depicted in MMCEs, dates of MMCEs, number of MMCEs in which two or more of the same entities appear therein, number of MMCEs in which each of two entities appear therein with a third entity, a combination thereof, and the like. For example, a social pattern may indicate that person A and person B appear in at least 25 images together, where the location is determined to be an office building. In an embodiment, the MMCEs are embedded with location data, such as Global Positioning System (GPS) coordinates, which may be matched to a public mapping database to determine the location of the capture of an MMCE. The location data may be included in, e.g., metadata associated with the MMCEs.

At S940, analytics are generated based on the social pattern. Analytics may include a social relationship between entities such as, but not limited to, a familial relationship, a friend relationship, a professional relationship, and the like. The social relationship may be determined based on the social linking score between the entities, e.g., where a social linking score between two entities above a first predetermined threshold may indicate a professional relationship, a social linking score above a second predetermined threshold may indicate a friend relationship, and a social linking score above a third predetermined threshold may indicate a familial relationship.

In a further embodiment, the analytics may be further generated based on one or more demographic parameters, names, and the like, of each entity (e.g., demographic parameters indicated in social media profiles of the entities, stored in a database, etc.). As a non-limiting example, if last names of the entities match (e.g., the entities are named "John Smith" and Mary Smith") and the social linking score is above a threshold, a familial relationship may be determined.

In another embodiment, signatures generated from MMCEs associated with the social linking graph may be utilized to identify objects that indicate a type of location in which the entities appear together, e.g., a couch indicating a home location and a desk with a computer indicating an office location. As a non-limiting example, if a social pattern indicates that person C and person D have a social linking score above 0.8, are depicted together in at least 25 images, wherein the majority of those images show a house, and the person C is at least 20 years older than person D, the analytics may be generated to indicate that person C is a parent of person D. In an embodiment, the generated analytics may be sent to a user device for display.

In a further embodiment, the analytics may include additional characteristics associated with the entities. Additional characteristics may include the hierarchy or position of a relationship, such as an older sibling and a younger sibling or an employer and employee. The additional characteristics may further include other shared information related to the relationship between the entities such as, but not limited to, same place of work, same positions of employment, same-working groups, same location of residence, and the like. The additional characteristics may be determined based on the depicted ages of the entities within the MMCEs, dynamics displayed within the MMCEs (e.g., an older person behind a desk indicating an employer, and a younger person standing in front of the desk indicating an employee), and the like. In some implementations, the additional characteristics may be determined based further on the type of relationship. As a non-limiting example, ages may only be compared when a familial relationship is determined.

In some implementations, S940 may further include comparing signatures representing one entity to signatures representing another entity to determine whether there is a similarity in appearance among the entities. The signatures of each entity may include portions of signatures generated for MMCEs associated with the social linking graph showing the respective entities. For example, if the signatures of the two entities match above a predetermined threshold, a similarity in appearance may be determined. The analytics may be generated based further on any determined similarities in appearance. For example, when the social linking score between two entities is above a threshold and the entities demonstrate a similarity in appearance, a familial relationship may be determined.

At S950, it is checked if more patterns are to be identified from the social linking graph. If so, execution continues with S930; otherwise, execution terminates. In some implementations, execution continues until no more patterns are identified.

Figure 10:
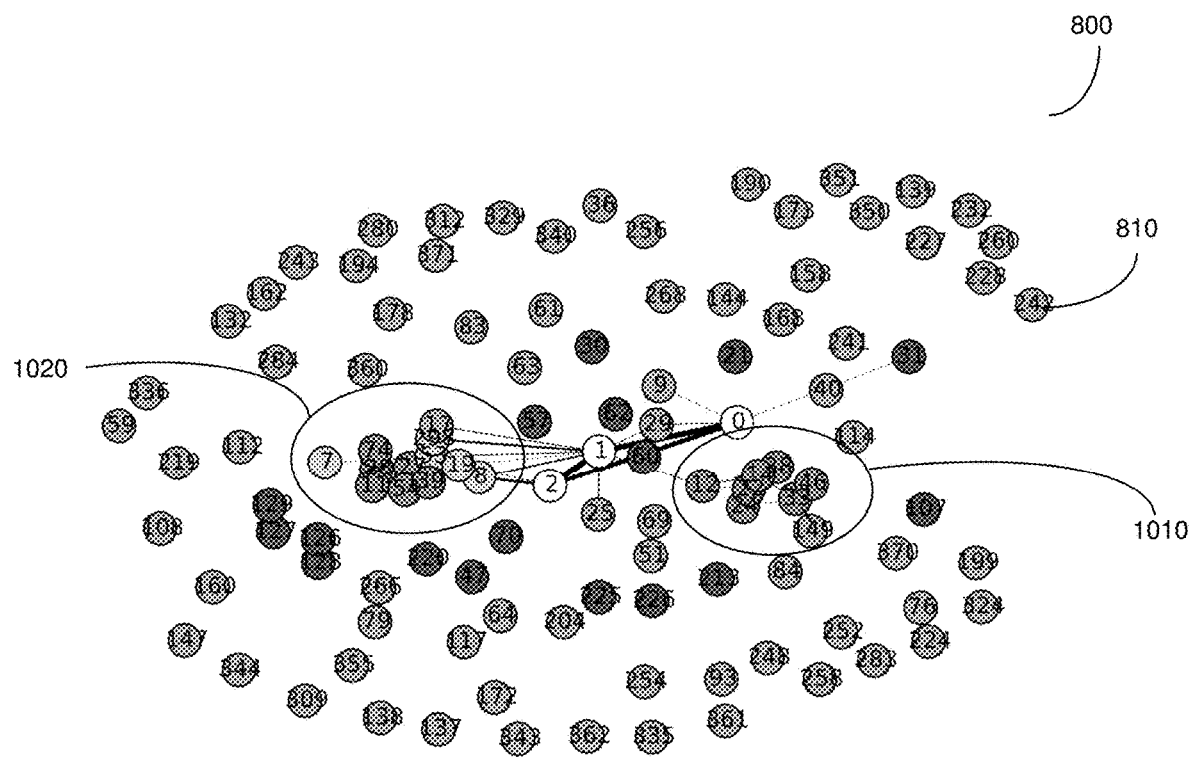
FIG. 10 is an example diagram of a social linking graph indicating groupings based on analytics in an embodiment.

FIG. 10 is an example diagram illustrating the social linking graph 800 indicating groupings 1010 and 1020. The social linking graph 800 indicates entities 810 representing entities identified in MMCEs, and the groupings 1010 and 1020 indicate the entities demonstrating social patterns. An analysis of the social patterns enables the discovery of analytics, such as the type of relationship between two or more entities. In some implementations, differences in color, shading, line thickness, and other visual markers may be utilized to visually differentiate among the various groupings shown in the social linking graph 800.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating analytics for entities depicted in multimedia content, comprising:
   accessing, by a server and over a network, at least one multimedia content element (MMCE);
   identifying, by a server, at least one social pattern based on social linking scores of a plurality of entities indicated in a social linking graph, wherein each social pattern is identified at least by comparing one of the social linking scores to at least one predetermined social pattern threshold, wherein each social linking score is generated, by the server, based on contexts of the at least one MMCE, wherein in each of the at least one MMCE at least two of the plurality of entities are depicted, wherein each context is determined based on a plurality of concepts of one of the at least one MMCE, wherein each concept matches at least one signature generated for the at least one MMCE above a predetermined threshold;
   wherein the identifying at least one social pattern further comprises:
   determining the plurality of concepts for each MMCE by a deep content classification system, wherein each concept is a collection of signatures representing MMCEs and metadata describing the concept, wherein each context of each MMCE is determined by correlating among the determined plurality of concepts of the MMCE; and wherein the signatures are robust to noise and distortion; and
   generating, based on the identified at least one social pattern and by the server, analytics for the plurality of entities depicted in the social linking graph.

2. The method of claim 1, wherein the plurality of entities is identified in the at least one MMCE based on the signatures generated for the at least one MMCE.

3. The method of claim 1, wherein the at least one social pattern includes at least one of: connections among the plurality of entities, locations depicted in the at least one MMCE, dates associated with the at least one MMCE, a number of MMCEs of the at least one MMCE in which each set of two of the plurality of entities appear, and a number of MMCEs of the at least one MMCE in which each set of two entities of the plurality of entities appear with a third entity.

4. The method of claim 1, wherein the analytics include at least one social relationship between two of the plurality of entities.

5. The method of claim 4, further comprising: determining at least one additional characteristic of each social relationship, wherein the analytics further include the determined at least one additional characteristic of each social relationship, wherein each additional characteristic is determined based on at least one of: demographic parameters of the at least two entities, at least one identified object in the at least one MMCE, and comparison between signatures representing the at least two entities.

6. The method of claim 1, wherein each social linking score is generated based further on at least one of: a number of MMCEs in which the at least two entities are shown, a time stamp associated with a first appearance of one of the at least two entities in the at least one MMCE, a time stamp associated with a last appearance of one of the at least two entities in the at least one MMCE, a physical interaction between the at least two entities depicted in at least one of the at least one MMCE, a location coordinate associated with each of the at least one MMCE, other entities depicted in the at least one MMCE, and tags of the at least one MMCE.

7. A non-transitory computer readable medium having stored thereon instructions for causing a processing circuitry of a server to perform a process, the process comprising:
   accessing over a network at least one multimedia content element (MMCE);
   identifying at least one social pattern based on social linking scores of a plurality of entities indicated in a social linking graph, wherein each social pattern is identified at least by comparing one of the social linking scores to at least one predetermined social pattern threshold, wherein each social linking score is generated based on contexts of the at least one MMCE, wherein in each of the at least one MMCE at least two of the plurality of entities are depicted, wherein each context is determined based on a plurality of concepts of one of the at least one MMCE, wherein each concept matches at least one signature generated for the at least one MMCE above a predetermined threshold;

wherein the identifying at least one social pattern further comprises:

determining the plurality of concepts for each MMCE by a deep content classification system, wherein each concept is a collection of signatures representing MMCEs and metadata describing the concept, wherein each context of each MMCE is determined by correlating among the determined plurality of concepts of the MMCE; and wherein the signatures are robust to noise and distortion;

and generating, based on the identified at least one social pattern, analytics for the plurality of entities depicted in the social linking graph.

8. A server for determining a social relativeness between at least two entities depicted in at least one multimedia content element (MMCE), comprising:

a processing circuitry; and a memory, the memory containing instructions that, when executed by the processing circuitry, configure the server to:

access over a network at least one multimedia content element (MMCE);

identify at least one social pattern based on social linking scores of a plurality of entities indicated in a social linking graph, wherein each social pattern is identified at least by comparing one of the social linking scores to at least one predetermined social pattern threshold, wherein each social linking score is generated based on contexts of the at least one MMCE, wherein in each of the at least one MMCE at least two of the plurality of entities are depicted, wherein each context is determined based on a plurality of concepts of one of the at least one MMCE, wherein each concept matches at least one signature generated for the at least one MMCE above a predetermined threshold;

wherein the identifying at least one social pattern further comprises:

determining the plurality of concepts for each MMCE by a deep content classification system, wherein each concept is a collection of signatures representing MMCEs and metadata describing the concept, wherein each context of each MMCE is determined by correlating among the determined plurality of concepts of the MMCE; and wherein the signatures are robust to noise and distortion; and generate, based on the identified at least one social pattern, analytics for the plurality of entities depicted in the social linking graph.

9. The server of claim 8, wherein the plurality of entities is identified in the at least one MMCE based on the signatures generated for the at least one MMCE.

10. The server of claim 8, wherein the at least one social pattern includes at least one of: connections among the plurality of entities, locations depicted in the at least one MMCE, dates associated with the at least one MMCE, a number of MMCEs of the at least one MMCE in which each set of two of the plurality of entities appear, and a number of MMCEs of the at least one MMCE in which each set of two entities of the plurality of entities appear with a third entity.

11. The server of claim 8, wherein the analytics include at least one social relationship between two of the plurality of entities.

12. The server of claim 11, that is configured to: determine at least one additional characteristic of each social relationship, wherein the analytics further include the determined at least one additional characteristic of each social relationship, wherein each additional characteristic is determined based on at least one of: demographic parameters of the at least two entities, at least one identified object in the at least one MMCE, and comparison between signatures representing the at least two entities.

13. The server of claim 8, that is configured to identify at least one social pattern by: determining the plurality of concepts for each MMCE, wherein each concept is a collection of signatures representing the content within the MMCE and metadata describing the concept, wherein each context of each MMCE is determined by correlating among the determined plurality of concepts of the MMCE.

14. The server of claim 8, wherein each social linking score is generated based further on at least one of: a number of MMCEs in which the at least two entities are shown, a time stamp associated with a first appearance of one of the at least two entities in the at least one MMCE, a time stamp associated with a last appearance of one of the at least two entities in the at least one MMCE, a physical interaction between the at least two entities depicted in at least one of the at least one MMCE, a location coordinate associated with each of the at least one MMCE, other entities depicted in the at least one MMCE, and tags of the at least one MMCE.

15. The method according to claim 1 comprising assigning a first social linking score to two of the plurality of entities when only the two of the plurality of entities appear together in the at least one MMCE; and assigning a second social linking score to the two of the plurality of entities when the two of the plurality of entities and additional entities appear together in the at least one MMCE; wherein the first social linking score is higher than the second social linking score.

16. The method according to claim 1 comprising assigning social linking score to two of the plurality of entities, the social linking score is based on (a) a number of the at least one MMCE, and (b) a physical interaction between the two of the plurality of entities that is captured in the at least one MMCE.

17. The method of claim 1, wherein the at least one social pattern includes locations depicted in the at least one MMCE.

18. The method according to claim 1 comprising assigning social linking score to two of the plurality of entities, the social linking score is based on whether the at least one MMCE captures a kissing of the two of the plurality of entities.

19. The method according to claim 1 wherein the accessing comprises accessing a user device to retrieve the at least one MMCE.

* * * * *